(12) United States Patent
Wong et al.

(10) Patent No.: US 11,893,473 B2
(45) Date of Patent: Feb. 6, 2024

(54) METHOD FOR MODEL ADAPTATION, ELECTRONIC DEVICE AND COMPUTER PROGRAM PRODUCT

(71) Applicant: EMC IP Holding Company LLC, Hopkinton, MA (US)

(72) Inventors: WuiChak Wong, Xiamen (CN); Sanping Li, Beijing (CN); Jin Li, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 847 days.

(21) Appl. No.: 16/807,499

(22) Filed: Mar. 3, 2020

(65) Prior Publication Data

US 2021/0133588 A1 May 6, 2021

(30) Foreign Application Priority Data

Nov. 1, 2019 (CN) .......................... 201911058634.1

(51) Int. Cl.
*G06N 3/04* (2023.01)
*G06N 3/049* (2023.01)
(Continued)

(52) U.S. Cl.
CPC ......... *G06N 3/049* (2013.01); *G06F 18/2415* (2023.01); *G06N 3/063* (2013.01); *G06N 3/088* (2013.01); *G06N 20/20* (2019.01)

(58) Field of Classification Search
CPC .... G06F 18/2415; G06N 20/00; G06N 20/20; G06N 3/049; G06N 3/063; G06N 3/088
See application file for complete search history.

(56) References Cited

U.S. PATENT DOCUMENTS

| 11,150,327 B1 * | 10/2021 | Jiang ...................... G06N 3/049 |
| 2018/0225562 A1 * | 8/2018 | van der Made ....... G06N 20/00 |
| 2020/0143229 A1 * | 5/2020 | Van Der Made ...... G06N 3/063 |

FOREIGN PATENT DOCUMENTS

CN          109886422 A     6/2019

OTHER PUBLICATIONS

P.U. Diehl et al., "Unsupervised Learning of Digit Recognition Using Spike-Timing-Dependent Plasticity," Frontiers in Computational Neuroscience, Aug. 3, 2015, pp. 1-9, vol. 9, No. 99.

\* cited by examiner

*Primary Examiner* — Brent Johnston Hoover
(74) *Attorney, Agent, or Firm* — Ryan, Mason & Lewis, LLP (57) ABSTRACT

A method for model adaptation, an electronic device, and a computer program product are disclosed. For example, the method comprises processing first input data by using a first machine learning model having first parameter set values, to obtain first feature information of the first input data, the first machine learning model having a capability of self-ordering and the first parameter set values being updated after the processing of the first input data; generating a first classification result for the first input data based on the first feature information by using a second machine learning model having second parameter set values; processing second input data by using the first machine learning model having the updated first parameter set values, to obtain second feature information of the second input data; and generating a second classification result for the second input data based on the second feature information by using the second machine learning model having the second parameter set values. As such, the machine learning model for classification can be adapted to changes in features of input data to provide better classification results.

20 Claims, 7 Drawing Sheets

(51) Int. Cl.
*G06N 3/088* (2023.01)
*G06N 20/20* (2019.01)
*G06N 3/063* (2023.01)
*G06F 18/2415* (2023.01)

METHOD FOR MODEL ADAPTATION, ELECTRONIC DEVICE AND COMPUTER PROGRAM PRODUCT

RELATED APPLICATION(S)

The present application claims priority to Chinese Patent Application No. 201911058634.1, filed Nov. 1, 2019, and entitled "Method for Model Adaptation, Electronic Device and Computer Program Product," which is incorporated by reference herein in its entirety.

FIELD

Embodiments of the present disclosure relate to the field of artificial intelligence and more specifically, to a method for model adaptation, an electronic device, and a computer program product.

BACKGROUND

In recent years, technologies such as high-performance computing, machine learning, deep learning and artificial intelligence have emerged and developed rapidly. Depending on these emerging technologies, technicians can design different processing tasks as required for various purposes. Such tasks are collectively referred to as machine learning tasks. Machine learning tasks often rely on a large amount of data and a high processing capability, especially a parallel processing capability. As such, in addition to general-purpose processing resources such as Central Processing Units (CPUs) and storage resources such as storage devices, execution of the machine learning tasks also requires dedicated processing resources such as Graphics Processing Units (GPUs) and Field Programmable Gate Arrays (FPGAs). Depending on different task objectives, complexity, and accuracy, different machine learning tasks may have different resource demands. Therefore, update of a machine learning model may be limited at least due to the resource consumption.

SUMMARY

Embodiments of the present disclosure provide a solution for model adaptation.

In a first aspect of the present disclosure, there is provided a method for model adaptation. The method comprises processing first input data by using a first machine learning model having first parameter set values, to obtain first feature information of the first input data, the first machine learning model having a capability of self-ordering and the first parameter set values being updated after the processing of the first input data; generating a first classification result for the first input data based on the first feature information by using a second machine learning model having second parameter set values; processing second input data by using the first machine learning model having the updated first parameter set values, to obtain second feature information of the second input data; and generating a second classification result for the second input data based on the second feature information by using the second machine learning model having the second parameter set values.

In a second aspect of the present disclosure, there is provided an electronic device. The electronic device comprises at least one processor; and at least one memory storing computer program instructions, the at least one memory and the computer program instructions being configured, with the at least processor, to cause the electronic device to perform acts. The acts comprises processing first input data by using a first machine learning model having first parameter set values, to obtain first feature information of the first input data, the first machine learning model having a capability of self-ordering and the first parameter set values being updated after the processing of the first input data; generating a first classification result for the first input data based on the first feature information by using a second machine learning model having second parameter set values; processing second input data by using the first machine learning model having the updated first parameter set values, to obtain second feature information of the second input data; and generating a second classification result for the second input data based on the second feature information by using the second machine learning model having the second parameter set values.

In a third aspect of the present disclosure, there is provided a computer program product. The computer program product is tangibly stored on a non-volatile computer readable medium and comprises machine-executable instructions, the machine-executable instructions, when executed, causing a device to: process first input data by using a first machine learning model having first parameter set values, to obtain first feature information of the first input data, the first machine learning model having a capability of self-ordering and the first parameter set values being updated after the processing of the first input data; generate a first classification result for the first input data based on the first feature information by using a second machine learning model having second parameter set values; process second input data by using the first machine learning model having the updated first parameter set values, to obtain second feature information of the second input data; and generate a second classification result for the second input data based on the second feature information by using the second machine learning model having the second parameter set values.

This Summary is provided to introduce a selection of concepts in a simplified form, which are further described in the Detailed Description below. This Summary is not necessarily intended to identify each and every key or essential feature of the claimed subject matter, nor is it intended to limit the scope of the claimed subject matter.

BRIEF DESCRIPTION OF THE DRAWINGS

The above and other objectives, features, and advantages of example embodiments of the present disclosure will become more apparent through the following detailed description with reference to the accompanying drawings, in which the same reference symbols refer to the same elements in exemplary embodiments of the present disclosure.

DETAILED DESCRIPTION

The principles of the present disclosure will now be described below with reference to several example embodiments shown in the accompanying drawings. Although some preferred embodiments of the present disclosure are shown in the accompanying drawings, it would be appreciated that these embodiments are described only to enable those skilled in the art to better understand and practice the present disclosure, without suggesting any limitation to the scope of the present disclosure in any way.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one further implementation." The terms "a first," "a second" and others may denote different or the same objects. Other definitions, either explicit or implicit, may be included below.

As used herein, "machine learning" refers to processing involving high-performance computing, machine learning, and artificial intelligence algorithms. As used herein, the term "machine learning model" may also be referred to as "learning model," "learning network," "network model" or "model". A "neural network" or "neural network model" is a deep machine learning model. Generally speaking, a machine learning model receives input information and performs prediction based on the input information.

Generally speaking, machine learning is divided into three phases, including a training phase, a test phase, and an application phase. In the training phase, a given machine learning model may be trained using a large amount of training samples, and the training is iterated constantly until the machine learning model may obtain, from the training samples, consistent inference that is similar to what can be made by human intelligence. Through training, the machine training model may be capable of learning a mapping or association relationship between the input and the output from the training data. Through the training, parameter set values of the machine learning model are determined. During the test phase, the test samples can be used to test the trained machine learning model to determine the performance of the machine learning model. In the application phase, the machine learning model can be used to process real-life input information based on the parameter set values obtained from the training to provide the corresponding output.

Figure 1:
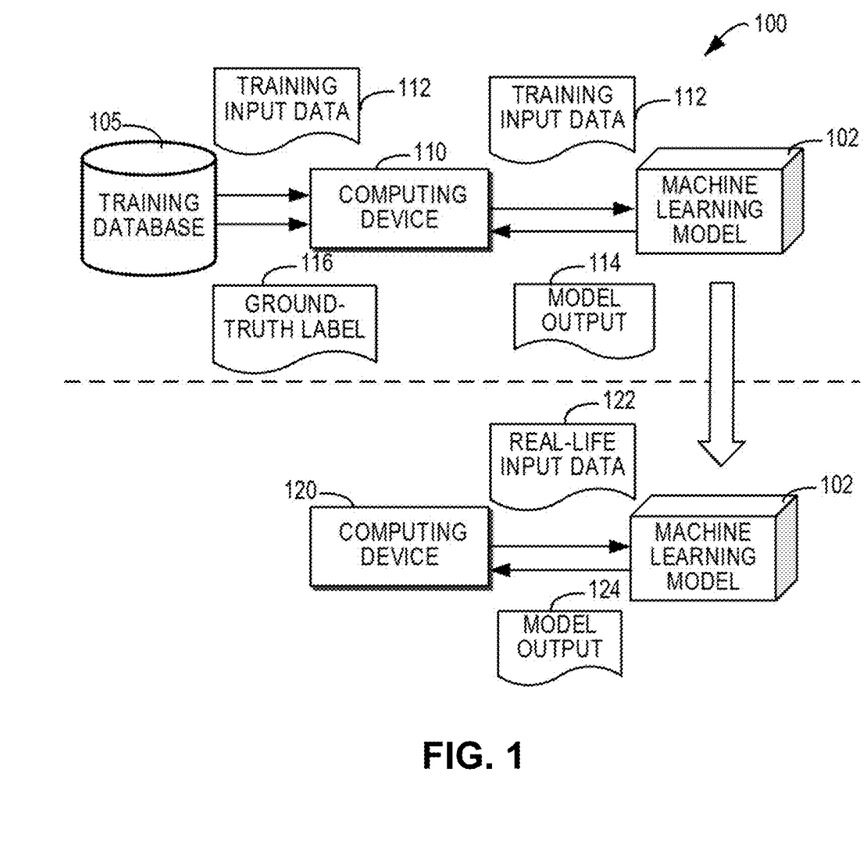
FIG. 1 illustrates a schematic diagram of a conventional machine learning model-based application.

FIG. 1 illustrates a schematic diagram 100 of a conventional machine learning model-based application. During the training phase, a computing device 110 for model training trains a machine learning model 102 using the training data. The computing device 110 may access a training database 105 which stores the training data for training the machine learning model 102.

The model training can be broadly divided into supervised learning and unsupervised learning. In supervised learning, training input data 112 and ground-truth labels 116 of the training input data 112 are used to train. Both the training input data 112 and the ground-truth labels 116 are referred to as training data for the machine learning model 102. The format of the training input data 112 is supported by the machine learning model 102. During the training process, each time the machine learning model 102 processes the training input data 112 based on parameter values of a current parameter set, it provides model outputs 114 based on the current parameter set. The computing device 110 compares the model outputs 114 with the ground-truth labels 116 to determine whether the parameter set values of the machine learning model 102 are accurate. For example, if a result of the comparison indicates that the difference is relatively large, the computing device 110 may continue to adjust the parameter set values. After a convergence condition is satisfied, the training of the machine learning model 102 is completed. In the unsupervised learning, the ground-truth labels 116 are not necessary and the machine learning model can analyze possible patterns in the training input data 112 during the training.

After the training of the machine learning model 102 is completed, the trained machine learning model 102 may be tested using known test data to determine the model performance. Such a test phase may also be performed by the computing device 110.

The trained machine learning model 102 may be applied. The machine learning model 102 may, for example, be provided to the computing device 120 for application. The trained machine learning model 102 may be considered to be an application program, a logic function block, a software component, and any other component that is executable by the computing device. The computing device 120 takes real-life input data 122 as an input to the machine learning model 102, runs the machine learning model 102, and obtains a model output 124 from the machine learning model 102.

The machine learning model 102 may be designed to implement various tasks. A common task is a general classification task, including binary-class, multi-classes classification, and anomaly detection in which the model outputs are some clustering results that indicate anomalous classes. When a classification problem is performed, the input of the machine learning model 102 may be structured data, unstructured data, and especially sequential data. Many problems encountered in practical application may be converted into classification problems. Therefore, many models have been designed to implement classification tasks. In the embodiments of the present disclosure described below, machine learning models for implementing classification tasks are mainly discussed.

Considering training and application of a machine learning model, a challenge is how to evolve the model to ensure that the model has a longer lifetime. One desired scenario is that after the machine learning model is in use, the model can still be evolved and updated, for example, by updating the parameter set values as needed, so as to learn the capability of processing input data with new features. This process is referred to as online training. The reason for the continuous evolution and update of the model is that the training data is always limited and features of input data to be processed by the model may change over time. In addition, in the application phase, the response speed of the model is also very important. This poses a higher challenge for online training. If new training data continue to be collected and offline training is performed, more costs are needed and the update of the model is delayed.

In an example, it is assumed that a machine learning model is trained to implement a behavior detection task, detecting and classifying the behavior of objects by analyzing ground-truth-time video data. After the model is placed in the application phase, it becomes a problem whether the model can still be adapted to the data changes and provide accurate classification results for new input data. The features in the new input data may change for various reasons. For example, a model for facial recognition can accurately recognize a baby from a large number of baby facial images after being trained. However, facial features of the baby may change as he/she grows up. It is desired that the machine learning model can capture such feature changes so as to provide accurate results. As another example, a model for detecting whether an account is attacked analyzes data related to a behavior of a user. If the user's behavior changes over time, it is also desired to make the machine learning model adapted to such changes.

In general, training of a machine learning model requires massive computing sources for calculating gradients and updating parameter set values. It is difficult to enable many common trained machine learning models adapted to new input data (for example, input data with new features). Some widely-used models, such as Convolutional Neural Networks (CNN) and Recurrent Neural Networks (RNN), are very complex and require a large number of complex operations, so it is more difficult for such models to implement the online training to learn features of new data. As described with reference to the machine learning model 102 of FIG. 1, in a conventional machine learning process, the model training and the model application are generally separated. After completing the training, the machine learning model is a fixed model and will not change.

Although there are some online training solutions, those solutions all require piling up the training process and the prediction process, and updating the model with data in batches after the input data is accumulated to a certain amount. In addition, in order to make the model appear to be running online and training online, these solutions will rely on various online architectures, training accelerators, and some efficient update logics. Thus, the overhead and cost are greatly increased. In these solutions, the training of the model still requires a backhaul process and some update processes, which brings about certain complexity.

On the other hand, collection of ground-truth labels for new input data is required to update the machine learning model. In practice, the collection of the ground-truth labels is time-consuming, for example, requiring manual labeling. A re-training process is started only after a certain amount of input data and ground-truth labels are accumulated. This prevents the training method using the supervised learning from providing fast model update.

Therefore, the current evolution and update of the machine learning model are undesirable considering the workload in re-training of the model with new input data and the overhead of collecting data for the re-training.

According to embodiments of the present disclosure, an improved solution for model adaptation is proposed. According to the solution, a machine learning model with a self-ordering mechanism is used to assist in extracting feature information of the input data, and the extracted feature information is provided to a machine learning model of classification to determine a classification result of the input data. The machine learning model with the self-ordering mechanism can adaptively change its parameter set after processing the input data. That is, the machine learning model can continuously learn from the input data in an unsupervised manner and update its parameter set. In this way, in the subsequent processing of the input data, new feature information can be extracted to facilitate the machine learning model of classification to determine more accurate classification results for the input data with new features. In this solution, by introducing the machine learning model capable of adaptively updating values in its own parameter set based on new input data, the other machine learning model of classification can be adapted to the update of the features in the input data and provide better classification results.

Figure 2:
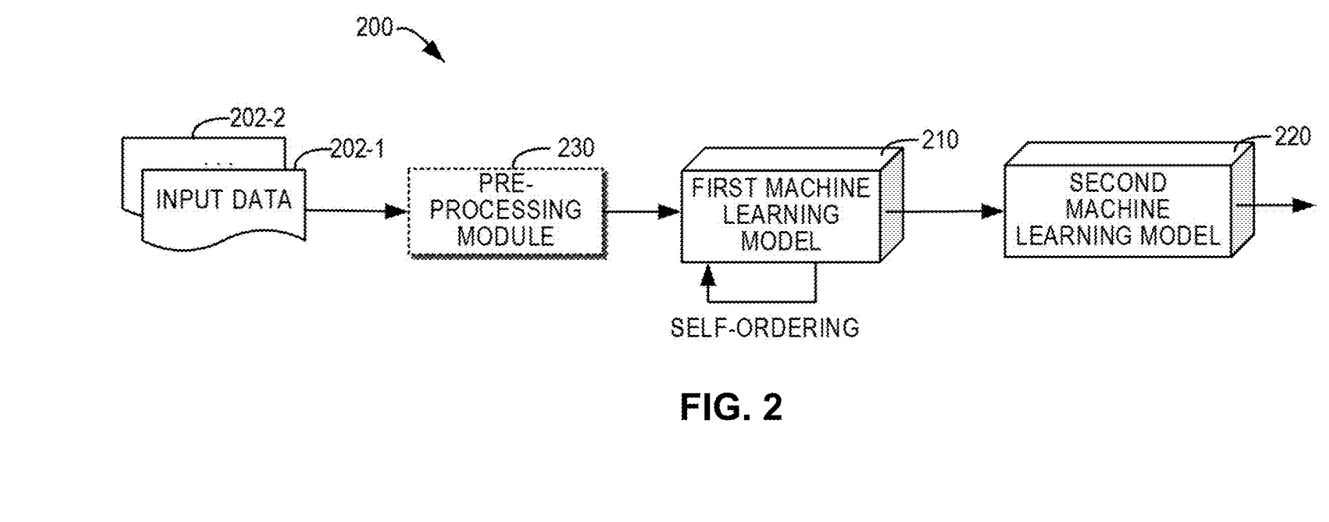
FIG. 2 illustrates a schematic diagram of a structure with adaptive model architecture according to some embodiments of the present disclosure.

FIG. 2 illustrates a schematic diagram of a structure with adaptive model architecture 200 according to some embodiments of the present disclosure. The model architecture 200 at least comprises a first machine learning model 210 and a second machine learning model 220. The model architecture 200, after being trained, may be applied to implement a classification task. The training of the model architecture 200 may, for example, be implemented by any device with a computing capability, such as the computing device 110 of FIG. 1. The application of the model architecture 200 may be implemented by any device having a computing capability, such as the computing device 120 of FIG. 1. The application of the model architecture 200 is discussed first below. For purpose of discussion, in the following, the model architecture 200 is implemented on the computing device 120.

In the model architecture 200, the first machine learning model 210 is a model having a capability of self-ordering. This allows the first machine learning model 210 to automatically discover new features in input data. Thus, parameter set values of the first machine learning model 210 may be updated in an unsupervised learning manner, without requiring backward propagation or gradient descent calculation as in conventional model training. An example of the first machine learning model 210 is an unsupervised spiking neural network (SNN). The unsupervised SNN can be adapted to input data based on plasticity rules similar to those in the human brain, such as spike-timing-dependent plasticity. The unsupervised SNN will be discussed in detail below. It would be appreciated that it is feasible to apply other machine learning models having a capability of self-ordering to adapt to the input data in an unsupervised learning manner.

In operation, if classification is to be performed on input data 202-1 (for purpose of discussion, referred to as first input data 202-1), the computing device 120 uses the first machine learning model 210 to process the first input data 202-1. The parameter set of the first machine learning model 210 is currently set to have first parameter set values. The model output of the first machine learning model 210 is feature information of the first input data 202-1 (referred to as the first feature information, for purpose of discussion). In some embodiments, the first input data 202-1 may be pre-processed, for example, by a pre-processing module 230, and the pre-processed first input data 202-1 is provided as the input to the first machine learning model 210. The pre-processing module 230 may be configured to convert the first input data 202-1 into a data form available for processing by the first machine learning model 210. The pre-processing module 230 will be described in detail below with reference to some examples.

With the self-ordering capability of the first machine learning model 210, after the processing of the first input data 202-1, if the features in the first input data 202-1 are different from features in the input data used in the training phase of the first machine learning model 210 or processed previously, the current first parameter set values of the first machine learning model 210 can be automatically updated.

The computing device 120 continues to process the first feature information by using the second machine learning model 220 to generate a first classification result for the first input data 202-1. Specifically, the first feature information is provided as an input of the second machine learning model 220. The second machine learning model 220 has been trained to have specific parameter set values (referred to as second parameter set values, for purpose of discussion). The second machine learning model 220 will process the first feature information and output the first classification result for the first input data 202-1.

The second machine learning model 220 may be configured as any machine learning model capable of performing a classification task. Examples of the second machine learning model 220 include, but are not limited to, a Reinforcement Learning (RL) model, a CNN, an RNN, a support vector machine (SVM), a probability model, a linear classification model, and the like. The classification task to be performed by the second machine learning model 220 is not limited and may, for example, be any of a binary classification task, a multi-classification task, anomaly detection task, and the like.

As mentioned above, the first machine learning model 210 has been adapted to the new first input data 202-1 and thus has its own first parameter set values updated adaptively. Then, if the computing device 120 receives input data 202-2 to be processed (referred to as second input data, for purpose of discussion), the computing device 120 further uses the first machine learning model 210 to process the second input data 202-2. At this time, the first machine learning model 210 may extract feature information of the second input data 202-2 based on the updated first parameter set values (referred to as second feature information, for purpose of discussion). If the features of the second input data 202-2 are similar to the features of the first input data 202-1, the first machine learning model 210 can extract the second feature information more easily and accurately. In some embodiments, the second input data 202-2 may be pre-processed, for example, by the pre-processing module 230, and the pre-processed second input data 202-2 is provided as an input to the first machine learning model 210.

The computing device 120 further uses the second machine learning model 220 to process the second feature information to generate a second classification result for the second input data 202-2. Since the second machine learning model 220 has no self-ordering capability, the parameter set values of the second machine learning model 220 are not changed. Therefore, after the second feature information is provided as the input to the second machine learning model 220, the second machine learning model 220 still processes the second feature information based on the second parameter set values to output the second classification result for the second input data 202-2.

Therefore, in the above process, the first machine learning model 210 with the self-ordering capability may be used as a data enhancer for the second machine learning model 220 for implementing classification. This enables the second machine learning model 220 to always output better classification results for data with new features.

Figure 3:
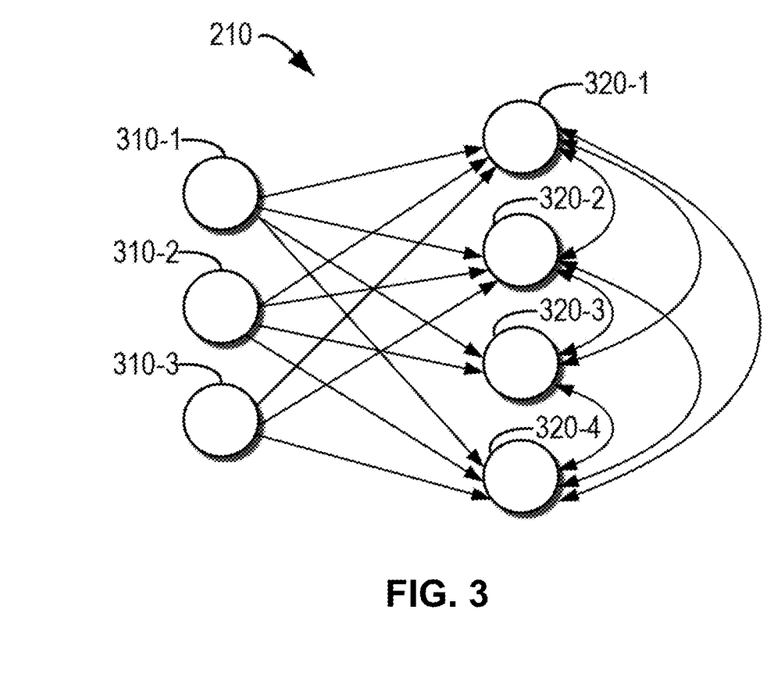
FIG. 3 illustrates a schematic diagram of an example structure of a first machine learning model according to some embodiments of the present disclosure.

As mentioned above, the first machine learning model 210 may be an unsupervised SNN (sometimes also referred to as a native SNN). The first machine learning model 210 based on the unsupervised SNN has a plurality of neurons as processing units which may respond to different features (patterns) in the input data, thereby stimulating different model outputs. FIG. 3 illustrates an example structure of the first machine learning model 210 according to some embodiments of the present disclosure. The example of FIG. 3 is only provided for better understanding of the unsupervised SNN, thus only a simple two-layer unsupervised SNN model is shown in the figure. It would be appreciated that the first machine learning model 210 based on the unsupervised SNN may be designed to have a similar but more complex model structure as required in actual use.

Generally, the first machine learning model 210 based on the unsupervised SNN is adapted to process spiking stream data. Therefore, the pre-processing module 230 for pre-processing of input data is configured to convert the input data of the first machine learning model 210 (for example, the first input data 202-1 or the second input data 202-2, which may be collectively or individually referred to as input data 202) into spiking stream data or sequential excitation data that are suitable for processing by the unsupervised SNN.

The first machine learning model 210 based on the unsupervised SNN as shown in FIG. 3 comprises a first layer of drive neurons, including drive neurons 310-1, 310-2, 310-3 (collectively or individually referred to as drive neurons 310), and a second layer of readout neurons, including readout neurons 320-1, 320-2, 320-3, 320-4 (collectively or individually referred to as readout neurons 320). The drive neurons 310 receive a model input, such as the pre-processed input data 202 from the pre-processing module 230, and process the pre-processed input data 202 with respective activation functions. The processing results of the drive neurons 310 are provided to each of the readout neurons 320. The readout neurons 320 are linked to each other with an inhibitive connection and this supports a winner take all (WTA) mechanism. Each readout neuron 320 is responsive to a different aspect of the features in the input data 202. Hence, the connections between the neurons can finally reflect the spiking relationship between one another, indicating which feature point is strong, which feature point is weak, which relationship is positive, and which relationship is negative.

If the first machine learning model 210 based on the unsupervised SNN is designed in a more complex manner, the input data 202 (or the pre-processed input data 202) will be processed layer by layer through more layers including the drive neurons, and finally provided to a layer including readout neurons. In addition, the number of neurons in each layer may be larger.

With the self-ordering characteristics of the unsupervised SNN, after the new input data is processed, if the new input data has new features, the neurons in the first machine learning model 210 based on the unsupervised SNN will respond to the new features, thereby changing the weights of the mutual connections, e.g., updating the parameter set values.

In some embodiments, the first machine learning model 210 based on the unsupervised SNN may be designed as a lightweight model. In some embodiments, the first machine learning model 210 based on the unsupervised SNN may be run on a neuromorphic chip in order to further improve the processing efficiency.

In some embodiments, although the first machine learning model 210 has a self-ordering capability and can achieve unsupervised learning, initially the first machine learning model 210 may be trained in a supervised learning manner to determine the initial first parameter set values. Specifically, the first machine learning model 210 may be trained using training input data and ground-truth label data for the training input data. The first machine learning model 210 is placed in an application phase after the training is completed.

Figure 4:
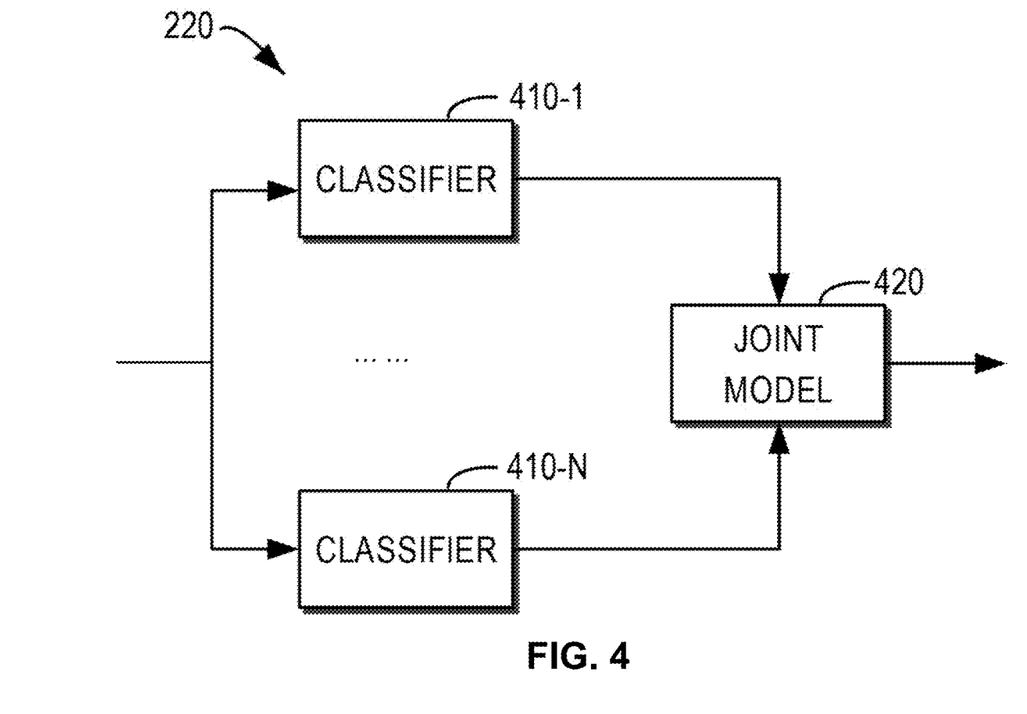
FIG. 4 illustrates a schematic diagram of an example structure of a second machine learning model according to some embodiments of the present disclosure.

In some embodiments, in order to improve the classification accuracy, the second machine learning model 220 may be based on a multi-proxy model architecture. FIG. 4 illustrates an example structure of the second machine learning model 220 according to some embodiments of the present disclosure. As shown in FIG. 4, the second machine learning model 220 may be based on a plurality of classifiers, comprising a classifier 410-1, . . . , classifier 410-N (collectively or individually referred to as classifiers 410), where N is an integer greater than or equal to 2. Each classifier 410 may be implemented based on a different machine learning model of classification. The second machine learning model 220 further comprises a joint model 420 to integrate output results of the N classifiers 410 to provide a final classification result for the input data 202. In this way, the multi-proxy-based model architecture can take advantages of various types of classification models to provide more accurate classification.

In some embodiments, the second parameter set values of the second machine learning model 220 may also be updated through offline training. Since the first machine learning model 210 can already provide faster adaptation to new features in new input data, the second machine learning model 220 may always be able to respond quickly to the new input data. In such a case, the delay in offline training will not affect the application of the second machine learning model 220.

Figure 5:
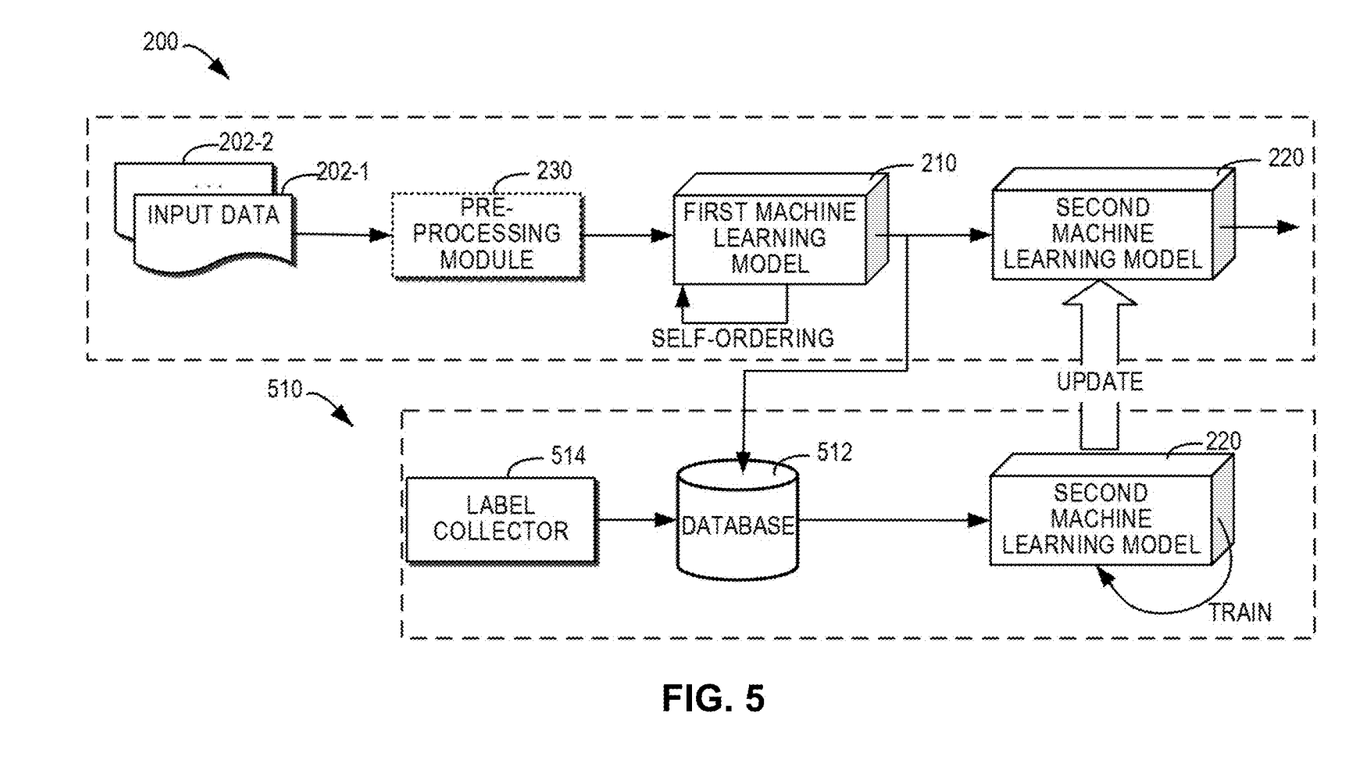
FIG. 5 illustrates a schematic diagram showing a structure of an adaptive model according to some other embodiments of the present disclosure.

FIG. 5 illustrates a model architecture according to some other embodiments of the present disclosure. As shown in FIG. 5, in addition to the model architecture 200, model update architecture 510 is also involved. In the model update architecture 510, a database 512 stores feature information output from the first machine learning model 210 by processing the input data 202, such as the first feature information of the first input data 202-1 and the second feature information of the second input data 202-2. The model update architecture 510 further comprises a label collector 514 for collecting a first ground-truth classification result for the first input data and/or a second ground-truth classification result for the second input data. The label collector 514 also stores the collected ground-truth classification results in the database 512. After the input data-ground-truth classification result training samples are accumulated to a certain number, re-training of the second machine learning model 220 may be triggered. A duplicated model of the second machine learning model 220 is stored in the model update architecture 510. The computing device used for model training may train the duplicated model of the second machine learning model 220 to update the second parameter set values.

After the training is completed, the second machine learning model 220 having the updated second parameter set values can be applied to update the second machine learning model 220 in the application stage. For example, the computing device 120 running the second machine learning model 220 configures the second machine learning model 220 with the updated second parameter set values. Therefore, the second machine learning model 220 in the model architecture 200 may use the updated second parameter set values for processing.

In some embodiments, since it might not be always possible to collect the first ground-truth classification result for the first input data or the second ground-truth classification result for the second input data, in order to avoid wasting the storage space, the first feature information or the second feature information stored in the database 512 may be discarded in the case of failing to obtain the first ground-truth classification result for the first input data or the second ground-truth classification result for the second input data after a predetermined time period.

It should be noted that in the embodiments of model training described above, the model training may be implemented by a computing device which applies the model architecture 200 is applied, for example, the computing device 120, or may be implemented by a different computing device, such as the computing device 110.

Figure 6:
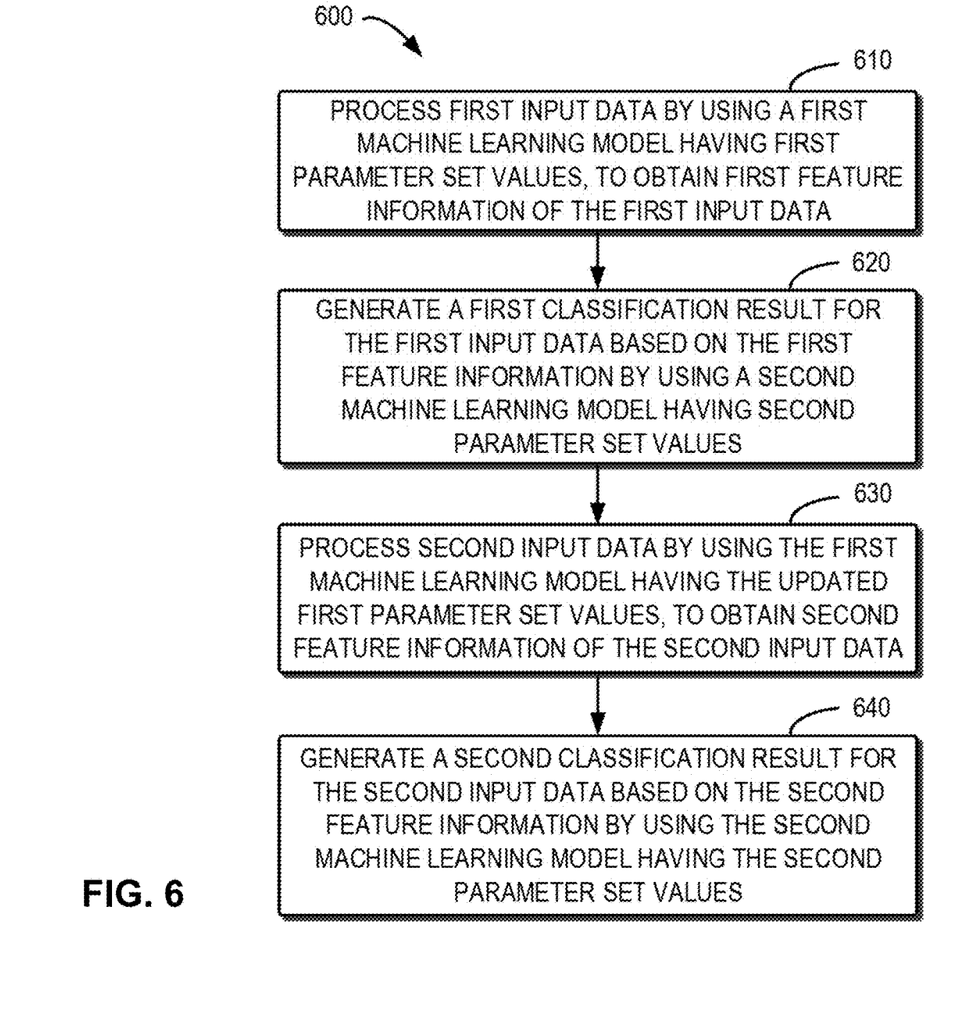
FIG. 6 illustrates a flowchart of a process for model adaptation according to some embodiments of the present disclosure.

FIG. 6 shows a flowchart of a process 600 for model adaptation according to an embodiment of the present disclosure. The process 600 may be implemented by the computing device 120 of FIG. 1, and may be implemented on the basis of the specific model architectures of FIG. 2 to FIG. 5.

At 610, the computing device 120 processes first input data by using a first machine learning model 210 having first parameter set values, to obtain first feature information of the first input data. The first machine learning model 210 has a capability of self-ordering and the first parameter set values are updated after the processing of the first input data. At 620, the computing device 120 generates a first classification result for the first input data based on the first feature information by using a second machine learning model 220 having a second parameter set values. At 630, the computing device 120 processes second input data by using the first machine learning model 210 having the updated first parameter set values, to obtain the second feature information of the second input data. At 640, the computing device 120 generates a second classification result for the second input data based on the second feature information by using the second machine learning model 220 having the second parameter set values.

In some embodiments, the first machine learning model 210 comprises an unsupervised spiking neural network (SNN). In some embodiments, processing the first input data comprises converting the first input data into first spiking stream data available for processing by the unsupervised SNN. In some embodiments, processing the second input data comprises converting the first input data into second spiking stream data available for processing by the unsupervised SNN.

In some embodiments, the first machine learning model 210 is run on a neuromorphic chip. In some embodiments, the first parameter set values are obtained by training the first machine learning model 210 based on training input data and ground-truth label data for the training input data.

In some embodiments, the second parameter set values of the second machine learning model 220 are obtained through a supervised learning process.

In some embodiments, the process 600 further comprises: storing at least one of the first feature information and the second feature information; in accordance with presence of at least one of the first ground-truth classification result for the first input data and the second ground-truth classification result for the second input data, and in accordance with a determination that update of the second machine learning model 220 is triggered, re-training a duplicated model of the second machine learning model 220 by using at least one of a pair of the first feature information and the first ground-truth classification result and a pair of the second feature information and the second ground-truth classification result, to update the second parameter set values; and in accordance with absence of the first ground-truth classification result for the first input data or the second ground-truth classification result for the second input data for a predetermined time period, discarding the first feature information or the second feature information.

In some embodiments, the process 600 further comprises configuring the second machine learning model 220 with the updated second parameter set values.

Figure 7:
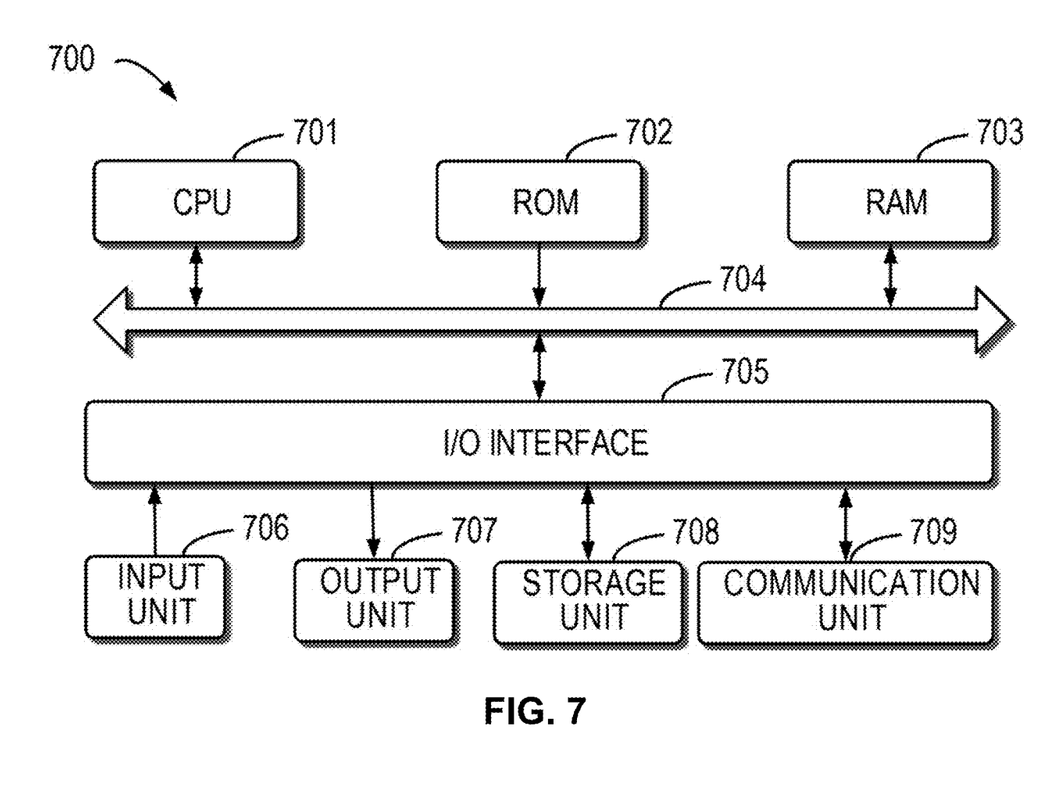
FIG. 7 illustrates a block diagram of an example device that can be used to implement embodiments of the present disclosure.

FIG. 7 illustrates a block diagram of an example device 700 that can be used to implement the embodiments of the present disclosure. The device 700 can be used to implement the process 600 of FIG. 6. The device 700 may be implemented as the computing device 110 or the computing device 120 in FIG. 1.

As shown, the device 700 comprises a central processing unit (CPU) 701, which can perform various acts and processes according to computer program instructions stored in a read-only memory (ROM) 702 or loaded to a random-access memory (RAM) 703 from a storage unit 708. The RAM 703 can also store various programs and data required by the operations of the device 700. The CPU 701, ROM 702, and RAM 703 are connected to each other via a bus 704. An input/output (I/O) interface 705 is also connected to the bus 704.

The following components in the device 700 are connected to the I/O interface 705: an input unit 706 such as a keyboard, a mouse, or the like; an output unit 707 such as various types of displays and speakers; a storage unit 708 such as a magnetic disk or optical disk; and a communication unit 709 such as a network card, a modem, a wireless communication transceiver or the like. The communication unit 709 enables the device 700 to exchange information/data with other devices via a computer network such as the Internet and/or various telecommunication networks.

Various methods and processes described above, such as the process 600, can also be performed by the CPU 701. In some embodiments, the process 600 can be implemented as a computer software program or a computer program product tangibly comprised in a machine-readable medium, such as a non-transitory computer-readable medium, for example the storage unit 708. In some embodiments, the computer program can be partially or fully loaded and/or mounted to the device 700 via the ROM 702 and/or the communication unit 709. When the computer program is loaded to the RAM 703 and executed by the CPU 701, one or more steps of the process 600 described above can be implemented. Alternatively, the CPU 701 can be configured via any other suitable manner (e.g., by means of firmware) to perform the process 600 in other embodiments.

It is to be understood by those skilled in the art that the above steps of the methods of the present disclosure may be implemented by a general-purpose computing device(s), being integrated on a single computing device or distributed on a network comprising multiple computing devices. Alternatively, the above steps of the methods may be implemented with program code executable by a computing device, so that they may be stored in a storage device and executed by the computing device, or may be fabricated as individual integrated circuit modules, respectively, or multiple modules or steps may be fabricated as individual integrated circuit modules for implementation. As such, the present disclosure is not limited to any particular combination of hardware and software.

It would be appreciated that although several means or sub-means of the device are mentioned in the detailed description above, this division is merely exemplary, not mandatory. In fact, according to embodiments of the present disclosure, the features and functions of the two or more devices described above may be embodied in one device. On the other hand, the features and functions of one device described above may be further divided and embodied by a plurality of devices.

Only optional embodiments of the present disclosure are described above, which is not intended to limit the present disclosure. For those skilled in the art, the present disclosure may have various modifications and changes. Any modification, equivalent replacements, and improvement made within the spirit and principle of this disclosure should be comprised in the scope of the present disclosure.

What is claimed is:

1. A method for model adaptation, comprising:
processing first input data by using a first machine learning model having first parameter set values, to obtain first feature information of the first input data, the first machine learning model having a capability of self-ordering and the first parameter set values being updated after the processing of the first input data;
generating a first classification result for the first input data based on the first feature information by using a second machine learning model having second parameter set values;
processing second input data by using the first machine learning model having the updated first parameter set values, to obtain second feature information of the second input data;
generating a second classification result for the second input data based on the second feature information by using the second machine learning model having the second parameter set values; and
generating adaptive change output data based on changes in the first input data and the second input data;
the method further comprising:
storing at least one of the first feature information and the second feature information; and
in accordance with a presence of at least one of a first ground-truth classification result for the first input data and a second ground-truth classification result for the second input data, and in accordance with a determination that an update of the second machine learning model is triggered, re-training a duplicated model of the second machine learning model by using at least one of a pair of the first feature information and the first ground-truth classification result and a pair of the second feature information and the second ground-truth classification result, so as to update the second parameter set values;
wherein the first machine learning model comprises an unsupervised spiking neural network; and
wherein the second machine learning model comprises a machine learning model other than an unsupervised spiking neural network and a supervised spiking neural network.

2. The method of claim 1,
wherein processing the first input data comprises: converting the first input data into first spiking stream data available for processing by the unsupervised spiking neural network, and
wherein processing the second input data comprises: converting the first input data into second spiking stream data available for processing by the unsupervised spiking neural network.

3. The method of claim 2, wherein the first machine learning model is run on a neuromorphic chip.

4. The method of claim 1, wherein the first parameter set values are obtained by training the first machine learning model based on training input data and ground-truth label data for the training input data.

5. The method of claim 1, wherein the second parameter set values of the second machine learning model are obtained through a supervised learning process.

6. The method of claim 1, further comprising:
in accordance with an absence of the first ground-truth classification result for the first input data or the second ground-truth classification result for the second input data for a predetermined time period, discarding the first feature information or the second feature information.

7. The method of claim 6, further comprising:
configuring the second machine learning model with the updated second parameter set values.

8. An electronic device, comprising:
at least one processor; and
at least one memory storing computer program instructions, the at least one memory and the computer program instructions being configured, with the at least one processor, to cause the electronic device to perform acts comprising:
processing first input data by using a first machine learning model having first parameter set values, to obtain first feature information of the first input data, the first machine learning model having a capability of self-ordering and the first parameter set values being updated after the processing of the first input data;
generating a first classification result for the first input data based on the first feature information by using a second machine learning model having second parameter set values;
processing second input data by using the first machine learning model having the updated first parameter set values, to obtain second feature information of the second input data;
generating a second classification result for the second input data based on the second feature information by using the second machine learning model having the second parameter set values; and
generating adaptive change output data based on changes in the first input data and the second input data;
wherein the acts further comprise:
storing at least one of the first feature information and the second feature information; and
in accordance with a presence of at least one of a first ground-truth classification result for the first input data and a second ground-truth classification result for the second input data, and in accordance with a determination that an update of the second machine learning model is triggered, re-training a duplicated model of the second machine learning model by using at least one of a pair of the first feature information and the first ground-truth classification result and a pair of the second feature information and the second ground-truth classification result, so as to update the second parameter set values;
wherein the first machine learning model comprises an unsupervised spiking neural network; and
wherein the second machine learning model comprises a machine learning model other than an unsupervised spiking neural network and a supervised spiking neural network.

9. The electronic device of claim 8, wherein processing the first input data comprises: converting the first input data into first spiking stream data available for processing by the unsupervised spiking neural network, and
wherein processing the second input data comprises: converting the first input data into second spiking stream data available for processing by the unsupervised spiking neural network.

10. The electronic device of claim 9, wherein the first machine learning model is run on a neuromorphic chip.

11. The electronic device of claim 8, wherein the first parameter set values are obtained by training the first machine learning model based on training input data and ground-truth label data for the training input data.

12. The electronic device of claim 8, wherein the second parameter set values of the second machine learning model are obtained through a supervised learning process.

13. The electronic device of claim 8, wherein the acts further comprise:
in accordance with an absence of the first ground-truth classification result for the first input data or the second ground-truth classification result for the second input data for a predetermined time period, discarding the first feature information or the second feature information.

14. The electronic device of claim 13, wherein the acts further comprise:
configuring the second machine learning model with the updated second parameter set values.

15. A computer program product which is tangibly stored on a non-transitory computer readable medium and comprises machine-executable instructions which, when executed by a device, causing the device to:
process first input data by using a first machine learning model having first parameter set values, to obtain first feature information of the first input data, the first machine learning model having a capability of self-ordering and the first parameter set values being updated after the processing of the first input data;
generate a first classification result for the first input data based on the first feature information by using a second machine learning model having second parameter set values;
process second input data by using the first machine learning model having the updated first parameter set values, to obtain second feature information of the second input data;
generate a second classification result for the second input data based on the second feature information by using the second machine learning model having the second parameter set values; and
generate adaptive change output data based on changes in the first input data and the second input data;
wherein the machine-executable instructions, when executed by the device, further cause the device to:
store at least one of the first feature information and the second feature information; and
in accordance with a presence of at least one of a first ground-truth classification result for the first input data and a second ground-truth classification result for the second input data, and in accordance with a determination that an update of the second machine learning model is triggered, re-train a duplicated model of the second machine learning model by using at least one of a pair of the first feature information and the first ground-truth classification result;
wherein the first machine learning model comprises an unsupervised spiking neural network; and wherein the second machine learning model comprises a machine learning model other than an unsupervised spiking neural network and a supervised spiking neural network.

16. The computer program product of claim 15, wherein processing the first input data comprises: converting the first input data into first spiking stream data available for processing by the unsupervised spiking neural network, and wherein processing the second input data comprises: converting the first input data into second spiking stream data available for processing by the unsupervised spiking neural network.

17. The computer program product of claim 16, wherein the first machine learning model is run on a neuromorphic chip.

18. The computer program product of claim 15, wherein the first parameter set values are obtained by training the first machine learning model based on training input data and ground-truth label data for the training input data.

19. The computer program product of claim 15, wherein the second parameter set values of the second machine learning model are obtained through a supervised learning process.

20. The computer program product of claim 15, wherein the machine-executable instructions, when executed by the device, further cause the device to:

in accordance with an absence of the first ground-truth classification result for the first input data or the second ground-truth classification result for the second input data for a predetermined time period, discarding the first feature information or the second feature information.

* * * * *